(12) United States Patent
Takagi

(10) Patent No.: US 11,342,706 B2
(45) Date of Patent: May 24, 2022

(54) CONNECTOR

(71) Applicant: JAPAN AVIATION ELECTRONICS INDUSTRY, LIMITED, Tokyo (JP)

(72) Inventor: Youhei Takagi, Irvine, CA (US)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 17/182,336

(22) Filed: Feb. 23, 2021

(65) Prior Publication Data
US 2022/0094103 A1    Mar. 24, 2022

Related U.S. Application Data

(60) Provisional application No. 63/080,173, filed on Sep. 18, 2020.

(51) Int. Cl.
*H01R 13/58* (2006.01)
*H01R 13/52* (2006.01)

(52) U.S. Cl.
CPC ..... *H01R 13/5841* (2013.01); *H01R 13/5205* (2013.01); *H01R 2201/26* (2013.01)

(58) Field of Classification Search
CPC ............ H01R 13/5841; H01R 13/5205; H01R 2201/26
See application file for complete search history.

(56) References Cited

U.S. PATENT DOCUMENTS

| | | | |
|---|---|---|---|
| 8,123,535 B1 * | 2/2012 | Yeon .................... | H01R 13/502 439/101 |
| 8,430,696 B2 | 4/2013 | Matsumoto et al. | |
| 9,281,606 B2 | 3/2016 | Mori | |
| 9,472,889 B2 | 10/2016 | Uchida | |
| 9,647,370 B2 | 5/2017 | Uchida | |

(Continued)

FOREIGN PATENT DOCUMENTS

| | | |
|---|---|---|
| DE | 102012024588 A1 | 6/2014 |
| JP | 2010055809 A | 3/2010 |

(Continued)

OTHER PUBLICATIONS

Extended European Search Report (EESR) dated Jan. 7, 2022, issued in European Application No. 21186848.4.

*Primary Examiner* — Briggitte R. Hammond
(74) *Attorney, Agent, or Firm* — Holtz, Holtz & Volek PC

(57) ABSTRACT

A connector comprises a housing, a holder, a contact, an electrical wire and a sleeve member. The contact is accommodated in a contact accommodation portion of the housing at least in part. The holder is attached to the housing and defines a rear end of the contact accommodation portion. An electrical wire is connected to the contact and extends outside thorough a through hole of the holder. The sleeve member has a main portion and three or more front protrusions. The main portion extends in a front-rear direction and has a C-shape section in a plane perpendicular to the front-rear direction. Each of the front protrusions protrudes forward from a front end of the main portion. The sleeve member is attached to the contact to accommodate a part of the contact and a part of the electrical wire in the main portion and located between an abutment portion and the holder. At least three of the front protrusions are brought into abutment with the abutment portion of the contact.

12 Claims, 11 Drawing Sheets

(56) References Cited

U.S. PATENT DOCUMENTS

| | | |
|---|---|---|
| 9,735,516 B2 | 8/2017 | Ens et al. |
| 2019/0334293 A1 | 10/2019 | Iwami et al. |

FOREIGN PATENT DOCUMENTS

| | | |
|---|---|---|
| JP | 2012185960 A | 9/2012 |
| JP | 2016012422 A | 1/2016 |
| JP | 2016197541 A | 11/2016 |
| JP | 2017016999 A | 1/2017 |
| JP | 2018156896 A | 10/2018 |
| JP | 2019192482 A | 10/2019 |

\* cited by examiner

CONNECTOR

BACKGROUND OF THE INVENTION

This invention relates to a connector, particularly to a connector provided with a contact which is connected to an electrical wire and accommodated in a housing.

A connector provided with a contact which is connected to an electrical wire and accommodated in a housing is disclosed in JP2010-55809A (Patent Document 1) for example.

As shown in FIG. 20, a connector 90 of Patent Document 1 is provided with a terminal metal 910, a connector housing 920, a rear holder 930, a sleeve member 940, a center packing 950 and a rear packing 960.

As shown in FIG. 21, the connector housing 920 is provided with a terminal accommodation room 922. The terminal metal 910 is accommodated in the terminal accommodation room 922 and connected to an electrical wire 970. The rear holder 930 is attached to a rear portion of the connector housing 920 and fills the terminal accommodation room 922 in part.

As shown in FIG. 21, the terminal metal 910 has a flange portion 912. The flange portion 912 prevents the terminal metal 910 from being moved forward with respect to the connector housing 920. Moreover, the center packing 950 is attached to the flange portion 912.

As shown in FIG. 21, the sleeve member 940 is arranged between the flange portion 912 of the terminal metal 910 and the rear holder 930. Furthermore, between the sleeve member 940 and the rear holder 930, the rear packing 960 is arranged. A part of the terminal metal 910 and a part of the electrical wire 970 are located inside the sleeve member 940. The electrical wire 970 passes through a through hole 962 formed in the rear packing and a through hole 932 formed in the rear holder 930 and extends rearward. The sleeve member 940 regulates rearward movement of the terminal metal 910 with respect to the connector housing 920 together with the rear packing 960.

SUMMARY OF THE INVENTION

The connector 90 of Patent Document 1 is structured so that a front-end surface of the sleeve member 940 is brought into abutment with the flange portion 912 of the terminal metal 910. If the front-end surface of the sleeve member 940 is perpendicular to a longitudinal direction of the sleeve member 940, the terminal metal 910 would extend straight along the longitudinal direction of the sleeve member 940 when the front-end surface of the sleeve member 940 is brought into abutment with the terminal metal 910. In contrast, when the front-end surface of the sleeve member 940 is not perpendicular to the longitudinal direction of the sleeve member 940, the terminal metal 910 would be inclined with respect to the longitudinal direction of the sleeve member 940 if the front-end surface of the sleeve member 940 is brought into abutment with the terminal metal 910. However, considering production variability, it is very hard that the front-end surface of the sleeve member 940 is made to be perpendicular to a longitudinal direction of the sleeve member 940. Accordingly, the connector 90 of Patent Document 1 has a problem that the terminal metal 910 may be inclined with respect to the sleeve member 940.

It is an object of the present invention to provide to provide a connector structured so that a tilt of a contact with respect to a sleeve member can be easily controlled.

One aspect of the present invention provides a connector comprising a housing, a holder, a contact, an electrical wire and a sleeve member. The housing is formed with a contact accommodation portion. The contact is accommodated in the contact accommodation portion at least in part. The holder is attached to the housing and defines a rear end of the contact accommodation portion in a front-rear direction. The holder is formed with a through hole piercing thereof in the front-rear direction. The electrical wire is connected to the contact and extends from the contact accommodation portion to an outside of the contact accommodation portion through the through hole of the holder. The contact is provided with an abutment portion. The sleeve member has a main portion and three or more front protrusions. The main portion extends in the front-rear direction and has a C-shape section on a plane perpendicular to the front-rear direction. Each of the front protrusions protrudes forward from a front end of the main portion in the front-rear direction. The sleeve member is attached to the contact so as to accommodate a part of the contact and a part of the electrical wire in the main portion and located between the abutment portion and the holder in the front-rear direction. At least three of the front protrusions are brought into abutment with the abutment portion.

In the connector according to the aspect of the present invention, the sleeve member has the three or more front protrusions, and the at least three of the front protrusions are brought into contact with the abutment portion of the contact. If the contact is tilted with respect to the sleeve member, it is only need to adjust a protruding dimension of one or more of the front protrusions. This is easy in comparison with adjusting a tilt of the whole of the front-end surface of the sleeve member that has the C-shape. For example, in a case where the sleeve member is made by molding, adjusting protruding amount of the front protrusion in a mold is remarkably easier than adjusting the tilt of the whole of the front-end surface having the C-shape in a mold.

An appreciation of the objectives of the present invention and a more complete understanding of its structure may be had by studying the following description of the preferred embodiment and by referring to the accompanying drawings.

Figure 1:
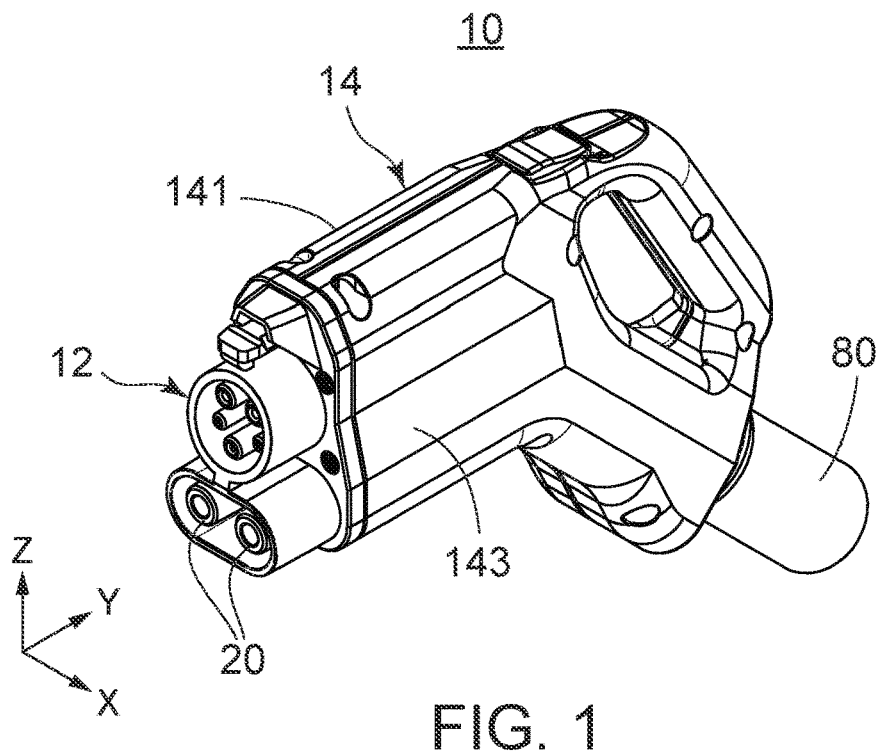
FIG. 1 is a front, perspective view showing a connector according to an embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Figure 3:
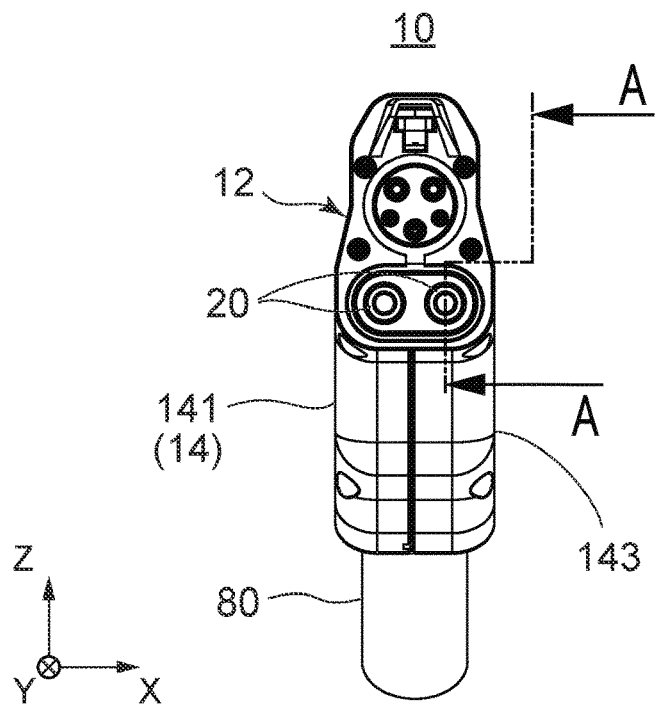
FIG. 3 is a front view showing the connector of FIG. 1.

Referring to FIGS. 1 and 3, a connector 10 according to an embodiment of the present invention is a charging connector for an electric vehicle, wherein it is attached to an end of a cable 80. However, the present invention is not limited thereto. The present invention is applicable to connectors for every use.

As shown in FIGS. 1 and 3, the connector 10 is provided with a mating portion 12 and a body 14. The body 14 has a base shell 141 and a cover shell 143.

Figure 2:
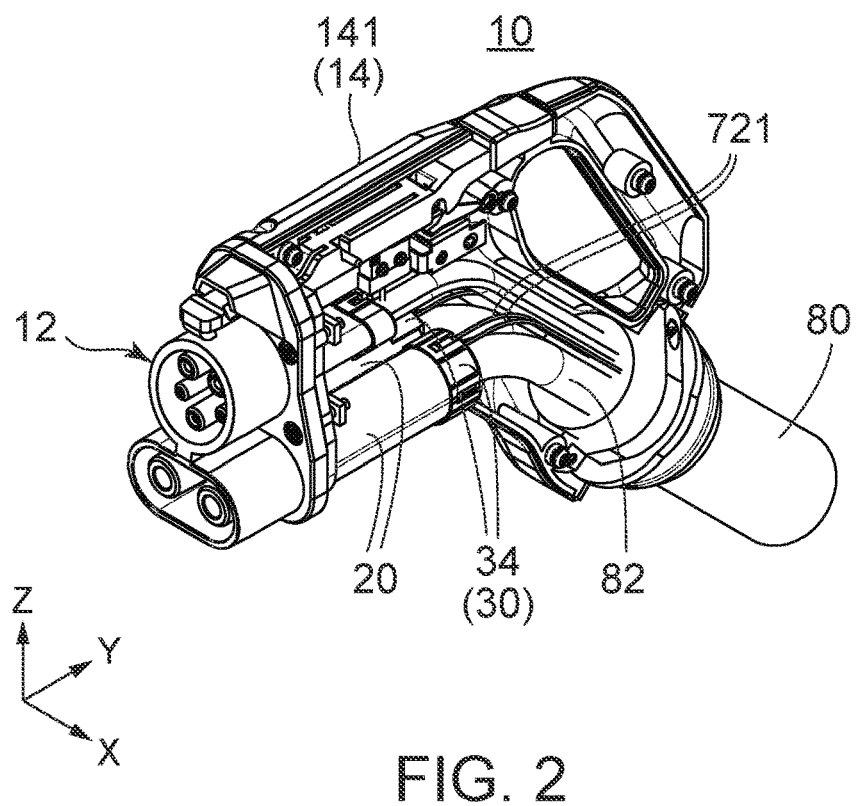
FIG. 2 is another front, perspective view showing the connector of FIG. 1. A cover shell is removed.
Figure 4:
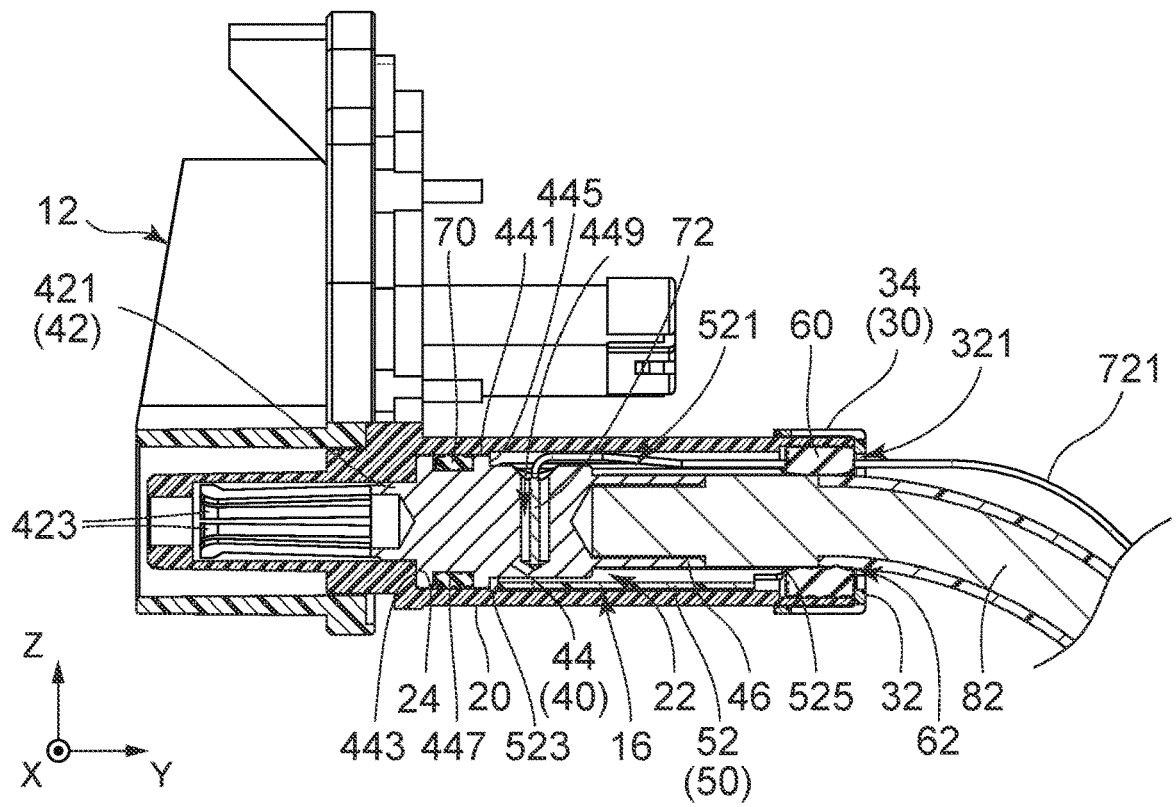
FIG. 4 is a cross-sectional view showing the connector of FIG. 3, taken along line A-A.

As shown in FIGS. 2 and 4, the base shell 141 is provided with housings 20. As understood from FIGS. 1, 3 and 4, in the present embodiment, the number of the housings 20 is two. However, the present invention is not limited thereto. The connector of the present invention should be provided with at least one housing 20. Moreover, the housings 20 may not be provided to the base shell 141 but be exposed outside.

As understood from FIGS. 2 and 4, holders 30 are attached to the housings 20, respectively. In detail, each of the holders 30 is attached to a rear-end portion of the housing 20 corresponding thereto. In the present embodiment, a front-rear direction is a Y-direction. A negative Y-direction is directed forward while a positive Y-direction is directed rearward.

As shown in FIG. 4, the holder 30 has an end face portion 32 and a sidewall portion 34 extending forward from the end face portion 32. The end face portion 32 is formed with a through hole 321 piercing the end face portion 32 in the front-rear direction.

As shown in FIG. 4, the housing 20 is formed with a contact accommodation portion 22. The holder 30 attached to the housing 20 defines a rear end of the contact accommodation portion 22 in the front-rear direction.

As shown in FIG. 4, in the contact accommodation portion 22 of the housing 20, a contact assembly 16 is accommodated. In detail, in the contact accommodation portion 22, a contact 40, a sleeve member 50, an annular member 60, a first waterproof member 70 and a sensor 72 are accommodated. In other words, the connector 10 is provided with the contact 40, the sleeve member 50, the annular member 60, the first waterproof member 70 and the sensor 72. However, the present invention is not limited thereto. The annular member 60, the first waterproof member 70 and the sensor 72 are not always necessary. The connector of the present invention should be provided with at least the contact 40 and the sleeve member 50 in addition to the housing 20 and the holder 30.

Figure 9:
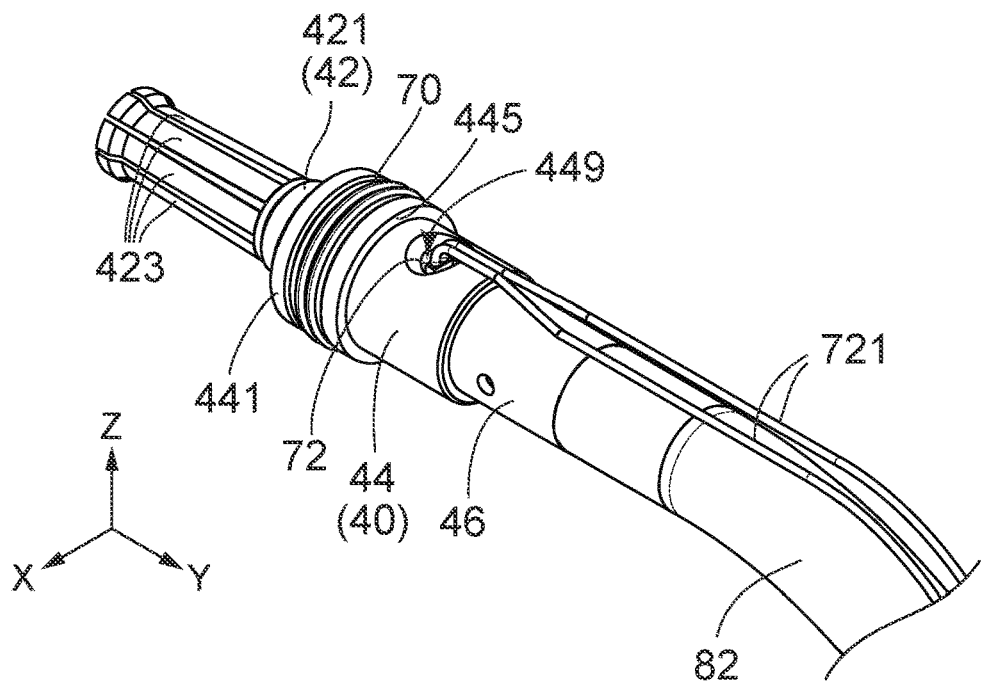
FIG. 9 is another rear, perspective view showing the contact assembly of FIG. 8. A sleeve member and the annular member are removed.
Figure 10:
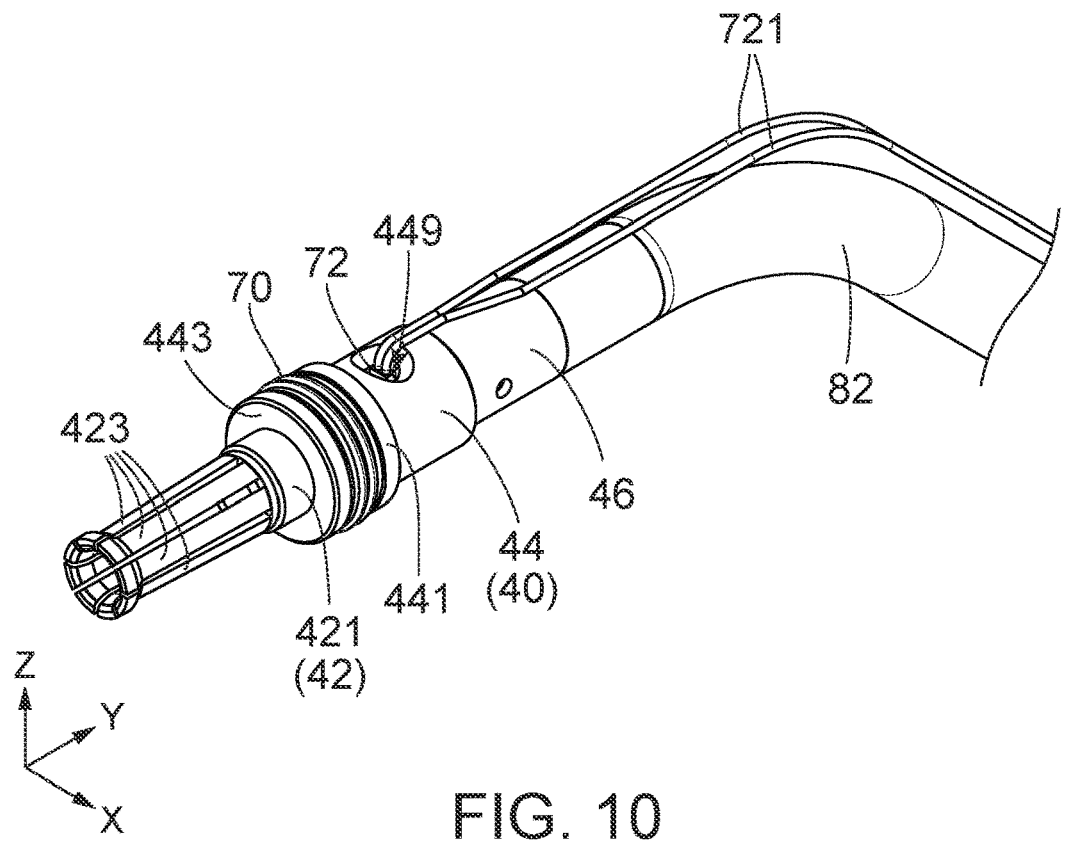
FIG. 10 is a front, perspective view showing the contact assembly of FIG. 9.

As shown in FIGS. 9 and 10, the contact 40 has a multistage cylindrical shape. In detail, the contact 40 has a connecting portion 42, a barrel portion 44 and a wire connection portion 46. The connecting portion 42, the barrel portion 44 and the wire connection portion 46 are arranged in this order in the front-rear direction so that their central axes are coincide with one another.

As understood from FIGS. 9 and 10, the connecting portion 42 has a base portion 421 with a cylindrical shape and a plurality of contact pieces 423 extending forward from the base portion 421. The contact pieces 423 are arranged at regular intervals in a circumference direction in a plane perpendicular to the front-rear direction. The contact pieces 423 are resiliently deformable. The contact pieces 423 come into contact with a mating contact (not shown) when the connector 10 is mated with an inlet (not shown). In the present embodiment, the number of the contact pieces 423 is eight. However, the present invention is not limited thereto. The connecting portion 42 may be freely designed about its structure and shape.

As understood from FIGS. 9 and 10, the barrel portion 44 has an external diameter larger than that of the base portion 421 of the connecting portion 42. The barrel portion 44 has a flange portion 441. An external diameter of the flange portion 441 is larger than that of the other portion of the barrel portion 44. The flange portion 441 has a front-end face 443 and a rear-end face 445. As described later, the rear-end face 445 of the flange portion 441 works as an abutment portion. In other words, the contact 40 is provided with the abutment portion.

As understood from FIGS. 9 and 10, an outer circumference surface of the flange portion 441 of the contact 40 is formed with a groove 447 recessed inward. To the groove 447, the first waterproof member 70 is attached. However, the present invention is not limited thereto. If the first waterproof member 70 is unnecessary, the groove 447 is unnecessary either.

As understood from FIGS. 4, 9 and 10, the barrel portion 44 is further formed with a hole 449 with a bottom. The hole 449 is bored along an up-down direction perpendicular to the front-rear direction. In the present embodiment, the up-down direction is a Z-direction. A positive Z-direction is directed upward while a negative Z-direction is directed downward. In the hole 449, the sensor 72 is inserted and arranged in a lengthwise direction. Wirings 721 of the sensor 72 extend upward from the sensor 72 and are bent at an approximately right angle at an edge of the hole 449. In other words, the wirings 721 of the sensor 72 are bent in the front-rear direction at the edge of the hole 449. Then, the wirings 721 of the sensor 72 extend outside the contact accommodation portion 22 through the through hole 321 of the holders 30. In this way, insertion and arrangement of the sensor 72 in the hole 449 formed in the up-down direction perpendicular to the front-rear direction and bending the wirings 721 at the approximately right angle allow a length of the barrel portion 44 to be reduced in the front-rear direction. Although bent portions of the wirings 721 are slightly rose from the barrel portion 44, they do not matter because they are located in a slit 521 of the sleeve member 50. In the present embodiment, the sensor 72 is a temperature sensor. However, the present invention is not limited thereto. If the sensor 72 is unnecessary, the hole 449 is unnecessary either.

As understood from FIGS. 4, 9 and 10, the wire connection portion 46 has an external diameter smaller than that of the barrel portion 44. However, the present invention is not limited thereto. The external diameter of the wire connection portion 46 may be equal to the external diameter of the barrel portion 44. To the wire connection portion 46, an electrical wire 82 included in the cable 80 is connected. The electrical wire 82 connected to the wire connection portion 46 of the contact 40 extends outside the contact accommodation portion 22 through the through hole 321 of the holders 30.

As shown in FIGS. 11 to 14, the sleeve member 50 has a main portion 52 having a cylindrical shape extending in the front-rear direction. The main portion 52 has a slit 521 extending in the front-rear direction. In other words, the sleeve member 50 is a split sleeve. The main portion 52 of the sleeve member 50 has a C-shape section in a plane perpendicular to the front-rear direction.

As shown in FIGS. 11 to 14, the sleeve member 50 has three or more front protrusions 54 protruding forward from a front-end face 523 of the main portion 52 in the front-rear direction. In the present embodiment, the number of the front protrusions 54 is four.

Figure 11:
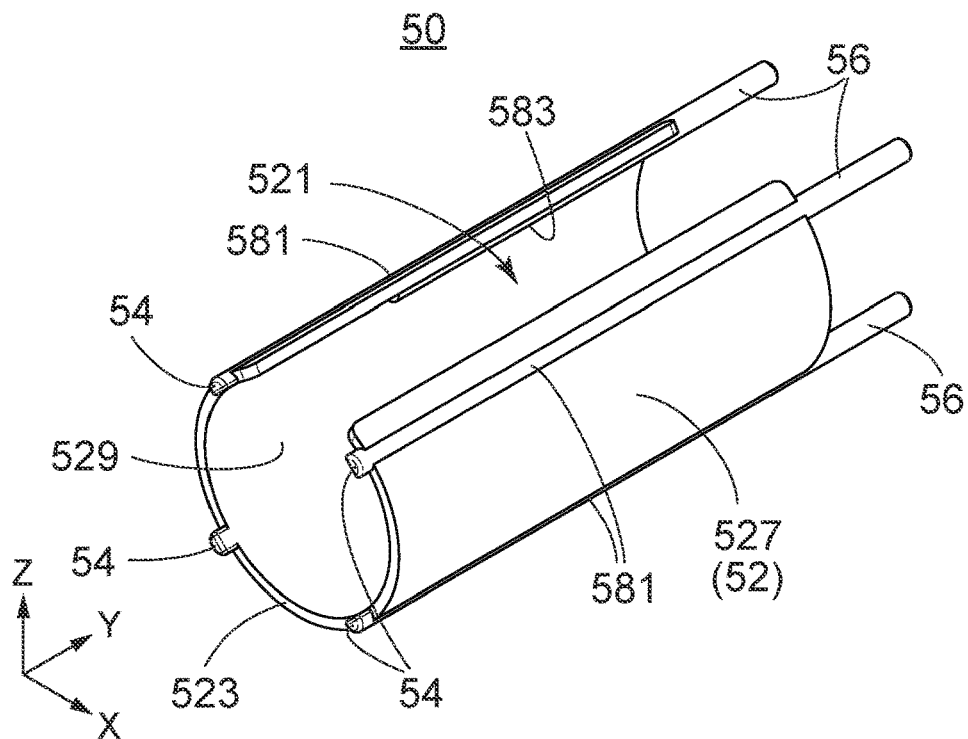
FIG. 11 is a front, perspective view showing the sleeve member included in the contact assembly of FIG. 6.
Figure 15:
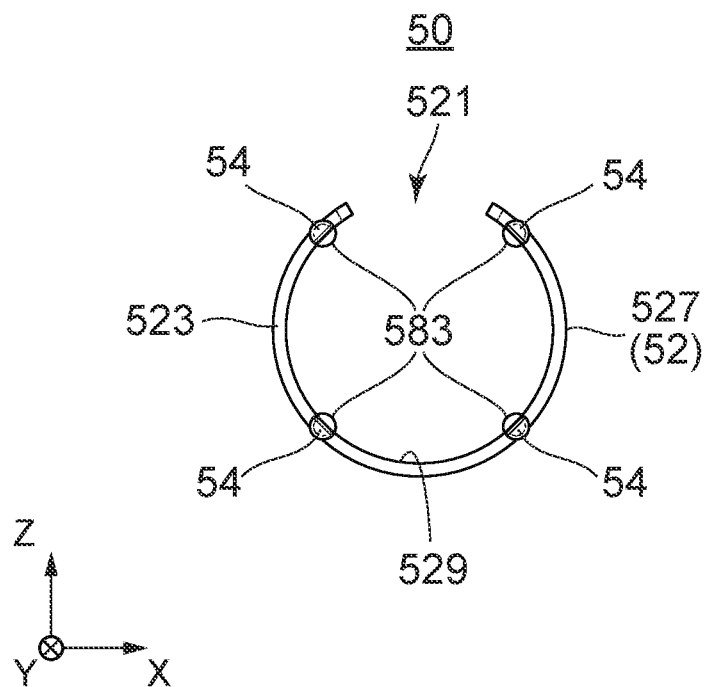
FIG. 15 is a front view showing the sleeve member of FIG. 11.

As shown in FIGS. 11 and 15, the front protrusion 54 has a semicircular section in a plane perpendicular to the front-rear direction. However, the present invention is not limited thereto. The shape of the front protrusion 54 may be any shape other than the semicircular shape, such as a polygonal shape, a circular shape or an oval shape.

Figure 8:
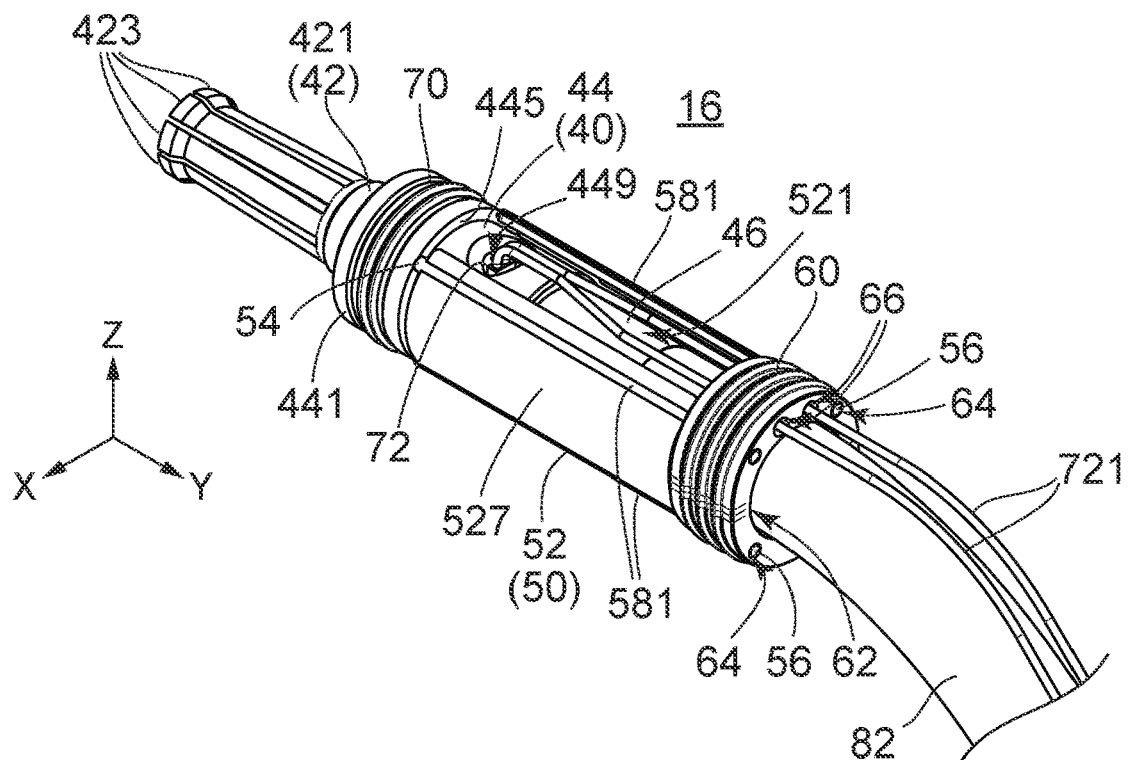
FIG. 8 is a rear, perspective view showing the contact assembly of FIG. 6.

As understood from FIG. 15, an arrangement of the front protrusions 54 has rotational symmetry about a symmetry axis extending in the front-rear direction. This is for making the front protrusions 54 be brought into abutment with the rear-end face 445 or the abutment portion of the flange portion 441 in a balanced manner when the sleeve member 50 is attached to the contact 40 as shown in FIG. 8.

As understood from FIG. 15, in a direction perpendicular to the front-rear direction and perpendicular to a surface (an outer circumference surface 527 or an inner circumference surface 529) of the main portion 52, a maximum size of the front protrusion 54 is larger than a size (a thickness) of the main portion 52 at the vicinity thereof. This is for giving necessary strength to the front protrusion 54. In the present embodiment, when viewed from the front of the sleeve member 50, the front protrusions 54 protrude radially outward of the main portion 52. However, the present invention is not limited thereto. The front protrusions 54 may protrude radially inward of the main portion 52 when viewed from the front of the sleeve member 50. Alternately, the front protrusions 54 may protrude both radially outward and radially inward of the main portion 52 when viewed from the front of the sleeve member 50.

As shown in FIGS. 11 to 14, the sleeve member 50 has three or more rear protrusions 56 protruding rearward from a rear-end face 525 of the main portion 52 in the front-rear direction. In the present embodiment, the number of the rear protrusions 56 is four. However, the present invention is not limited thereto. The rear protrusions 56 are not always necessary. Nevertheless, it is preferable to have the rear protrusions 56 in a case where the annular member 60 has resilience, for example, the annular member 60 is a second waterproof member. This is for ensuring regulation of rearward movement of the contact 40 with respect to the housing 20.

Figure 12:
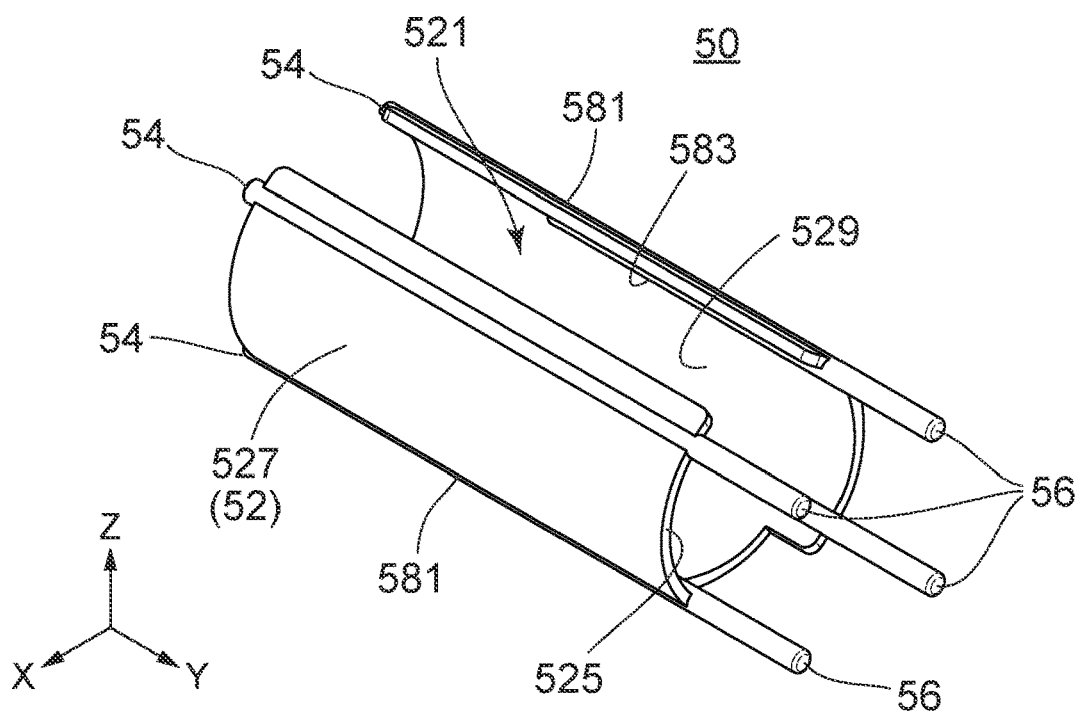
FIG. 12 is a rear, perspective view showing the sleeve member of FIG. 11.
Figure 13:
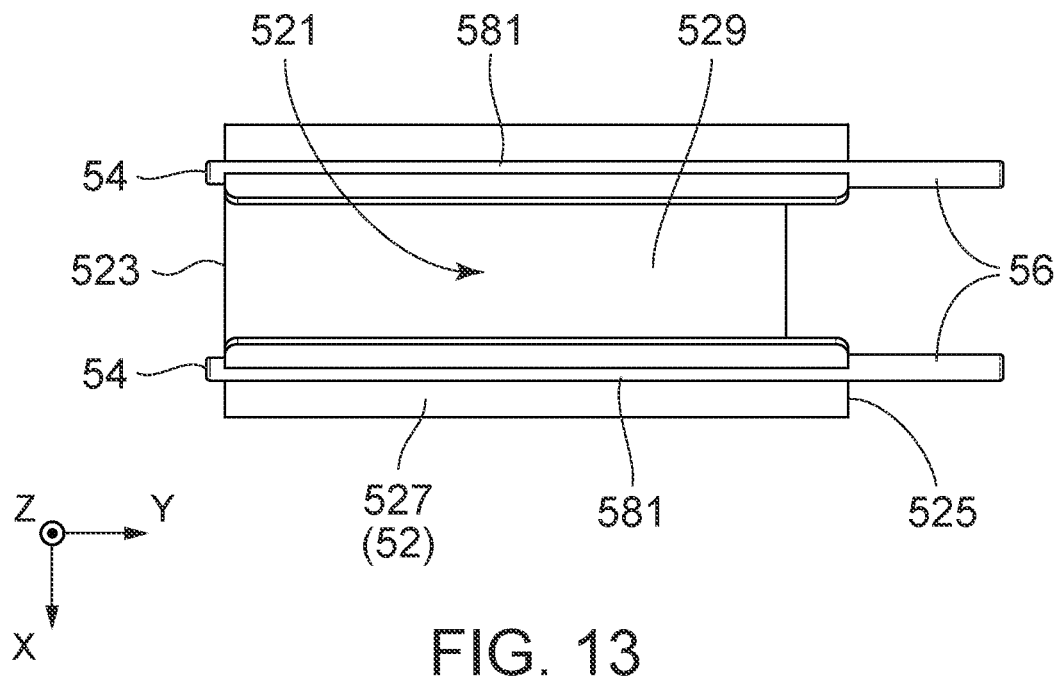
FIG. 13 is a plane view showing the sleeve member of FIG. 11.
Figure 14:
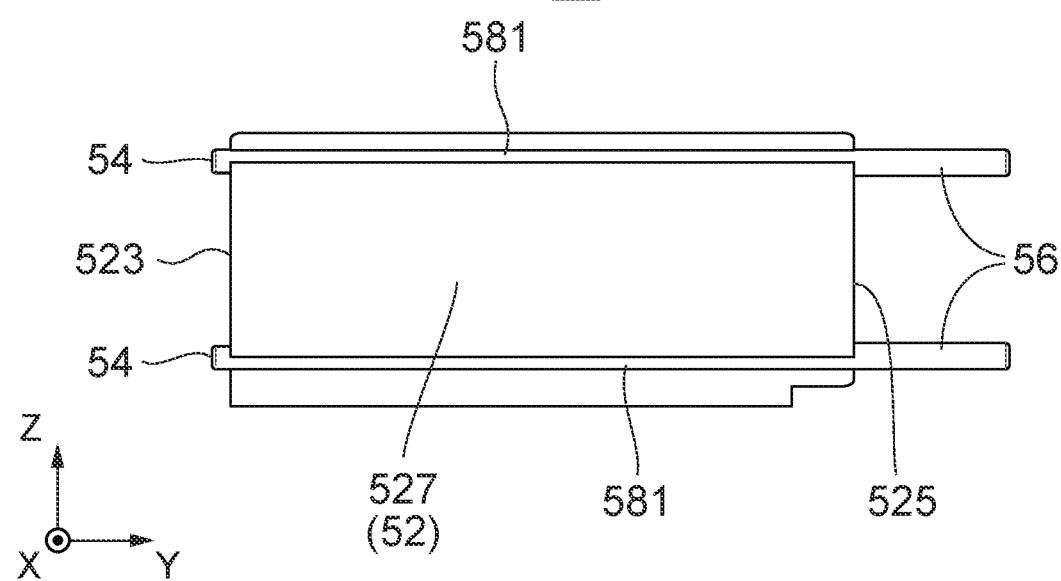
FIG. 14 is a side view showing the sleeve member of FIG. 11.
Figure 16:
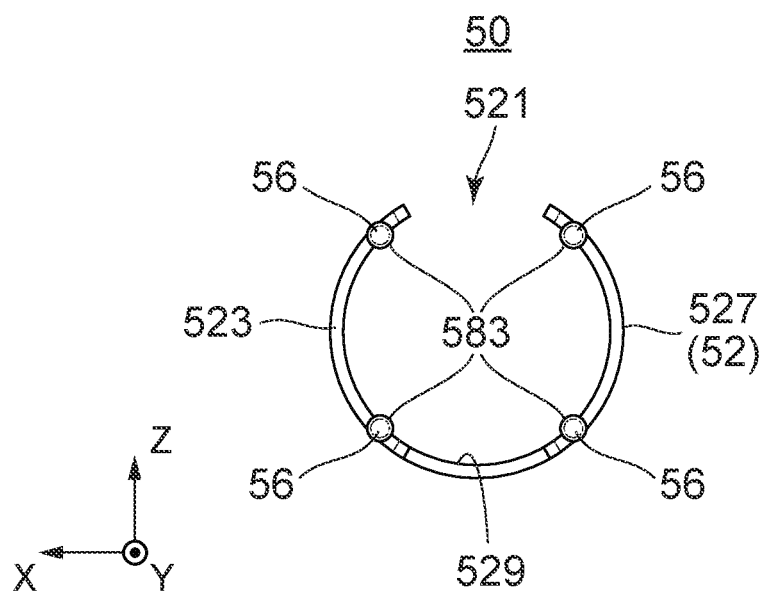
FIG. 16 is a rear view showing the sleeve member of FIG. 11.

As shown in FIGS. 12 and 16, the rear protrusion 56 has a circular shape section in a plane perpendicular to the front-rear direction. However, the present invention is not limited thereto. The shape of the rear protrusion 56 may be any shape other than the circular shape, for example, a polygonal shape, a half circular shape or an oval shape. However, it is desirable that a cross-sectional area of the rear protrusion 56 is large to secure strength of the rear protrusion 56.

As understood from FIG. 16, an arrangement of the rear protrusions 56 has rotational symmetry about a symmetry axis extending in the front-rear direction. This is for making the rear protrusions 56 be brought into abutment with the end face portion 32 of the holder 30 in a balanced manner.

As understood from FIG. 16, in the direction perpendicular to the front-rear direction and perpendicular to the surface (the outer circumference surface 527 or the inner circumference surface 529) of the main portion 52, a maximum size of the rear protrusion 56 is larger than a size (a thickness) of the main portion 52 at the vicinity thereof. In the present embodiment, when viewed from behind the sleeve member 50, the rear protrusions 56 protrude both radially outward and radially inward of the main portion 52. However, the present invention is not limited thereto. When viewed from behind the sleeve member 50, the rear protrusions 56 may protrude either radially inward or radially outward of the main portion 52.

As understood from FIGS. 11 to 16, the front protrusions 54 correspond to the rear protrusions 56, respectively. On the outer circumference surface 527 of the main portion 52, outer elongated protrusions 581 coupling the front protrusions 54 with the rear protrusions 56 corresponding to the front protrusions 54, respectively, in the front-rear direction are provided. The outer elongated protrusions 581 protrude radially outward from the outer circumference surface 527 of the main portion 52. Although the outer elongated protrusions 581 are not always necessary, they can give strength to the sleeve member 50.

As understood from FIGS. 11 and 12, the inner circumference surface 529 of the main portion 52 is provided with inner elongated protrusions 583 continuous with the rear protrusions 56. The inner elongated protrusions 583 protrude radially inward from the inner circumference surface 529 of the main portion 52. The inner elongated protrusions 583 extend forward to the middle of the main portion 52 in the front-rear direction. This is in consideration of a difference between the external diameter of the barrel portion 44 of the contact 40 and the external diameter of the wire connection portion 46. However, the present invention is not limited thereto. The inner elongated protrusions 583 may extend to the front protrusions 54. In that case, provided that enough strength can be secured for the sleeve member 50, the outer elongated protrusions 581 may not be provided. At any rate, it is preferable to provide an elongated protrusion coupling each of the front protrusions 54 with the rear protrusion 56 corresponding to the front protrusion 54 in the front-rear direction on at least one of the outer circumference surface 527 and the inner circumference surface 529 of the main portion 52.

Figure 17:
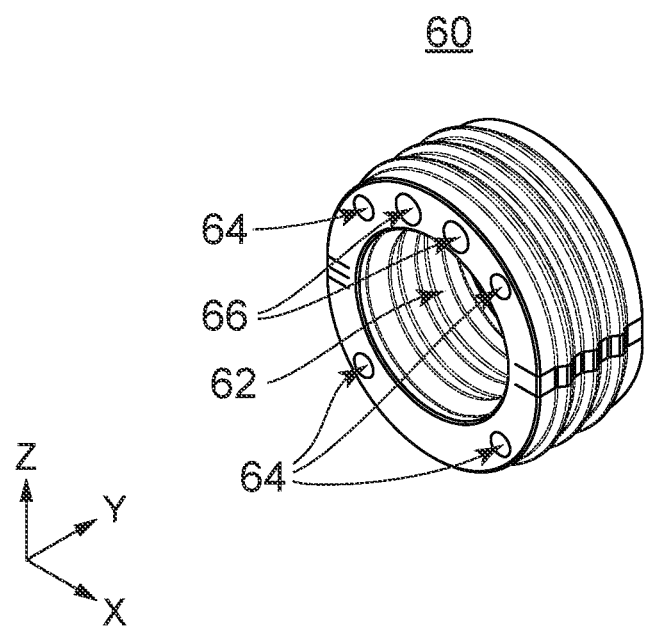
FIG. 17 is a front, perspective view showing the annular member included in the contact assembly of FIG. 6.
Figure 18:
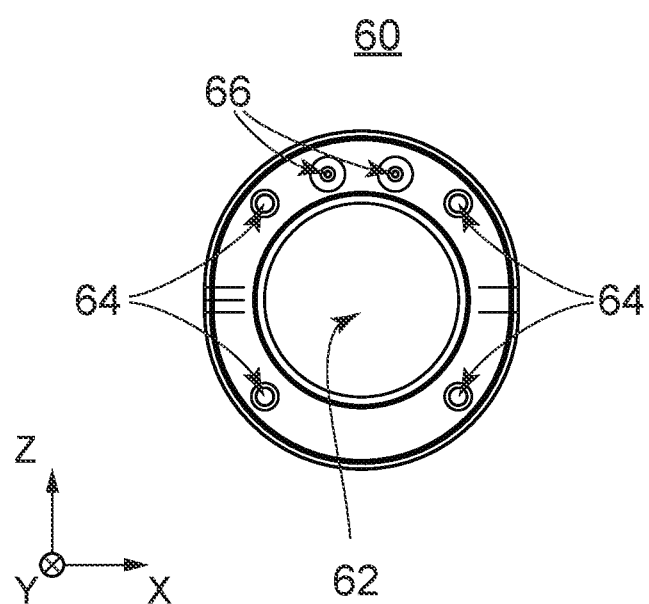
FIG. 18 is a front view showing the annular member of FIG. 17.
Figure 19:
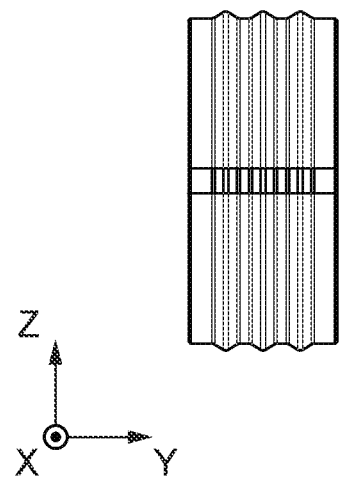
FIG. 19 is a side view showing the annular member of FIG. 17.
Figure 20:
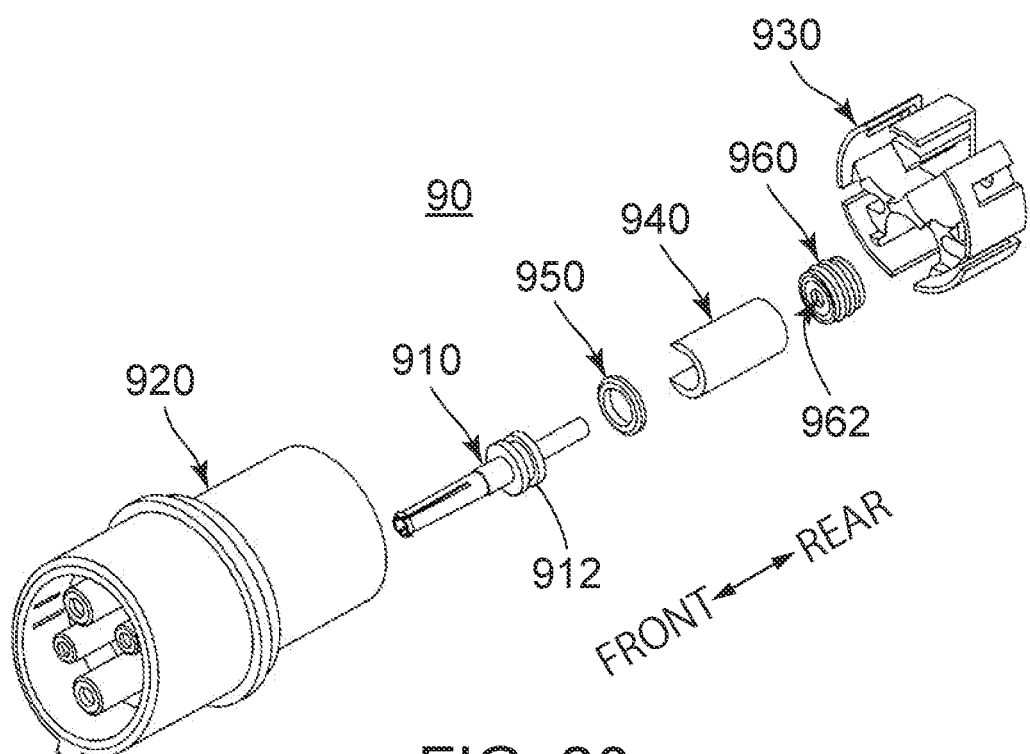
FIG. 20 is an exploded, perspective view showing a connector disclosed in Patent Document 1.
Figure 21:
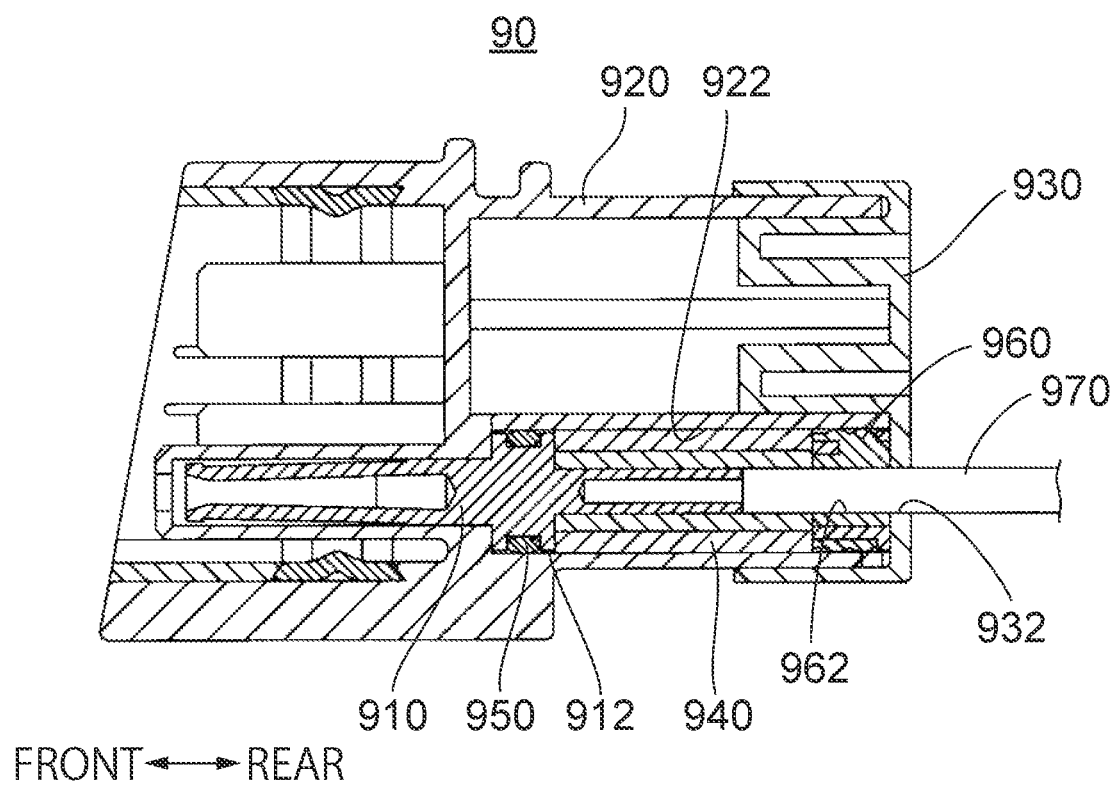
FIG. 21 is a cross-sectional view showing the connector of FIG. 20.

Referring to FIGS. 17 to 19, in the present embodiment, the annular member 60 is the second waterproof member. In other words, in the present embodiment, the connector 10 is provided with the second waterproof member. In detail, the annular member 60 is formed with synthetic rubber to have a bellows shape. With this structure, the annular member 60 is resiliently deformable in the front-rear direction and resiliently deformable in radial directions.

As shown in FIGS. 17 and 18, the annular member 60 is formed with three or more through holes 64 and one or more additional through holes 66 which pierce the annular member 60 in the front-rear direction in addition to a central hole 62. The through holes 64 correspond to the rear protrusions 56 of the sleeve member 50. In the present embodiment, the number of the through holes 64 is four. The additional through holes 66 correspond to the wirings 721 of the sensor 72. In the present embodiment, the number of the additional through holes 66 is two. However, the present invention is not limited thereto. The number of the through holes 64 depends on the number of the rear protrusions 56, and the number of the additional through holes 66 depends on the number of the wirings 721.

Figure 6:
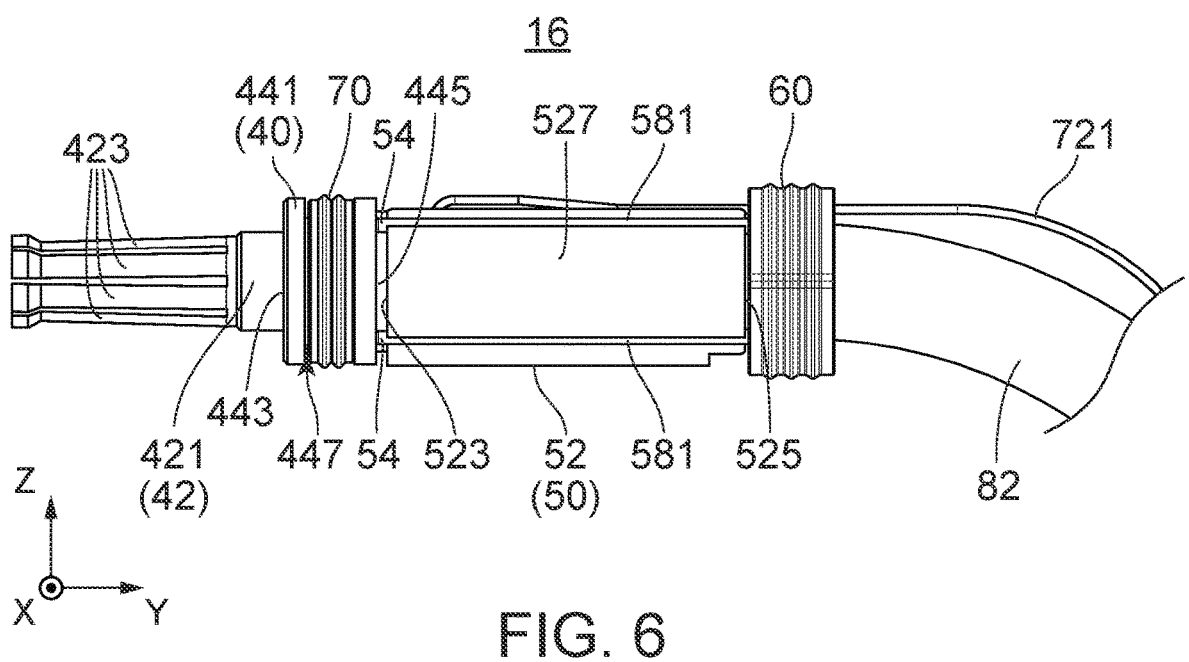
FIG. 6 is a side view showing a contact assembly included in the connector of FIG. 2.
Figure 7:
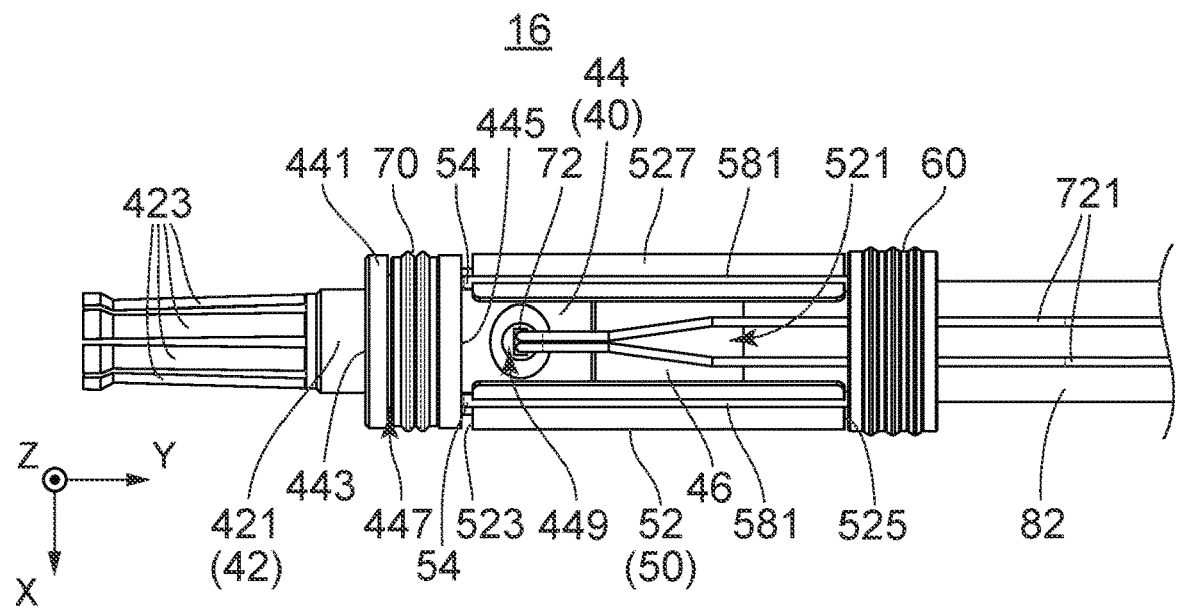
FIG. 7 is a plane view showing the contact assembly of FIG. 6.

As shown in FIGS. 6 to 8, the contact 40, the sleeve member 50 and the annular member 60 are combined with one another to form the contact assembly 16.

As understood from FIGS. 6 to 8, the sleeve member 50 is attached to the contact 40. At that time, a part of the contact 40 and a part of the electrical wire 82 are accommodated in the main portion 52 of the sleeve member 50. In detail, as shown in FIG. 4, the sleeve member 50 is located rearward of the flange portion 441 of the contact 40 in the front-rear direction. And, a part of the barrel portion 44 of the contact 40 and the wire connection portion 46 are located in the main portion 52 of the sleeve member 50. The wirings 721 of the sensor 72 are located in the slit 521 in part. Further, the wirings 721 pass through the slit 521 and extend rearward.

As shown in FIGS. 6 to 8, the annular member 60 is attached to the sleeve member 50. At that time, the rear protrusions 56 of the sleeve member 50 are inserted into the through holes 64 of the annular member 60 that correspond to them, respectively. Moreover, the wirings 721 of the sensor 72 pass through the additional through holes 66 of the annular member 60 that correspond to them and extend rearward.

As understood from FIG. 4, when the contact assembly 16 is accommodated in the housing 20, the first waterproof member 70 is sandwiched between the flange portion 441 of the contact 40 and the housing 20. Then, the first waterproof member 70 prevents water entering the contact accommodation portion 22 from the front thereof from reaching the sensor 72 or the wire connection portion 46. The first waterproof member 70 is made of synthetic rubber and has an annular shape.

As shown in FIG. 4, when the contact 40 is accommodated in the housing 20, the front-end face 443 of the flange portion 441 is brought into contact with an abutment surface 24 of the housing 20. Accordingly, forward movement of the contact 40 with respect to the housing 20 is regulated. In the present embodiment, the whole of the contact 40 is located in the housing 20. However, the present invention is not limited thereto. The contact 40 should be accommodated in the contact accommodation portion 22 of the housing 20 at least in part. For example, the connecting portion 42 may protrude forward from the housing 20 in part.

As shown in FIG. 4, the sleeve member 50 is located between the flange portion 441 of the contact 40 and the holder 30 in the front-rear direction when it is accommodated in the contact accommodation portion 22 of the housings 20. In detail, the sleeve member 50 is located between the rear-end face 445 of the flange portion 441, i.e. the abutment portion, and the end face portion 32 of the holder 30. At that time, the front protrusions 54 are brought into abutment with the rear-end face 445 of the flange portion 441. Thus, the rear-end face 445 of the flange portion 441 works as the abutment portion with which the front protrusions 54 are brought into abutment.

It is desirable that protruding dimensions of the front protrusions 54 are equal to one another. However, there is a case where the protruding dimensions of the front protrusions 54 are different from one another due to production variation. In that case, if differences among the protruding dimensions of the front protrusions 54 are within a permissible range, at least three of the front protrusions 54 are brought into abutment with the rear-end face 445. In a case where the differences among the protruding dimensions of the front protrusions 54 are out of the permissible range, the number of the front protrusions 54 which are brought into abutment with the rear-end face 445 may be one or two so that positional relationship between the contact 40 and the sleeve member 50 may be unstable. In addition, there is a possibility that the front protrusions 54 are damaged. Accordingly, in the case where the differences among the protruding dimensions of the front protrusions 54 are out of the permissible range, the protruding amounts of the front protrusions 54 must be adjusted. This adjustment of the protruding amounts of the front protrusions 54 may be made to a mold which is used to manufacture the sleeve member 50. This adjustment is remarkably easier than adjustment for a mold which is used for manufacturing the sleeve member 940 of Patent Document 1. In other words, the adjustment of the protruding amounts of the front protrusions 54 is remarkably easier than adjusting a tilt of the whole of the front-end surface of the sleeve member 940 of Patent Document 1.

Figure 5:
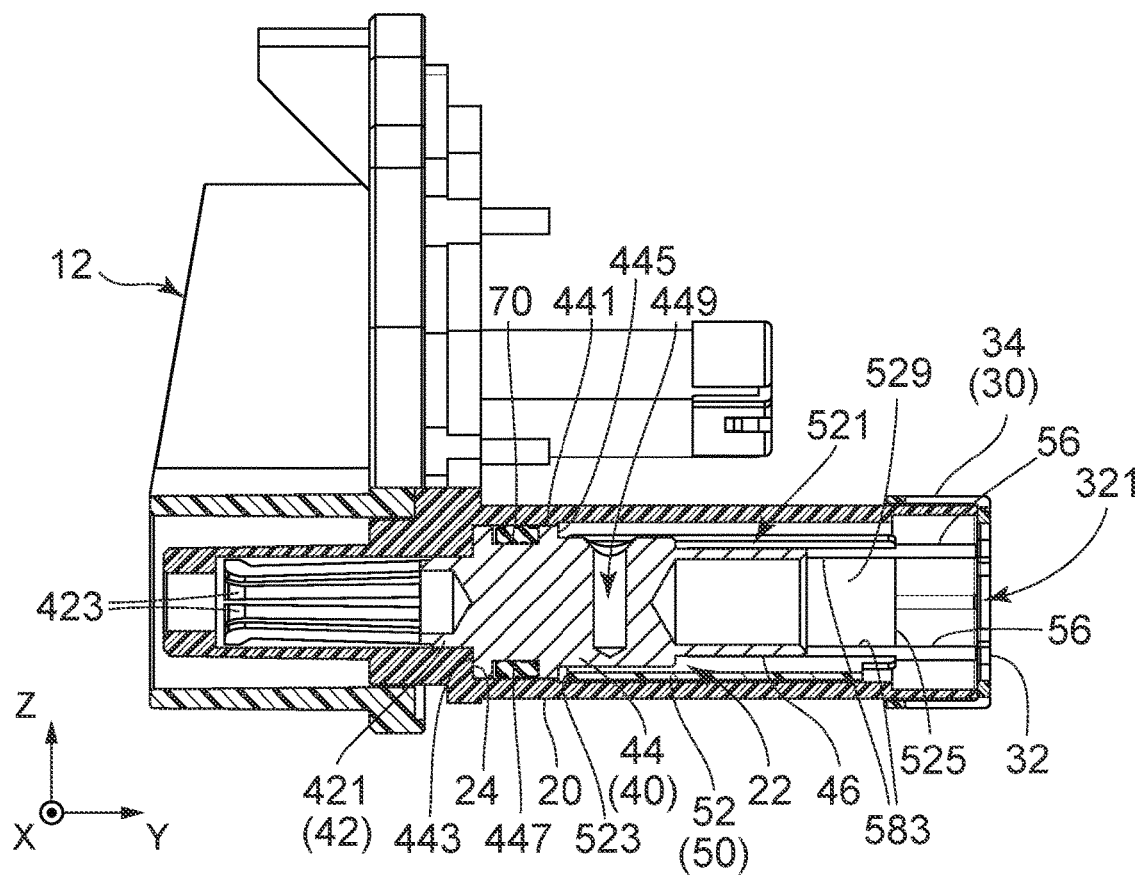
FIG. 5 is another cross-sectional view showing the connector of FIG. 4. An electrical wire, an annular member, a sensor and wires thereof are removed.

As understood from FIG. 5, when the sleeve member 50 is accommodated in the contact accommodation portion 22 of the housing 20, the rear protrusions 56 of the sleeve member 50 are brought into abutment with the end face portion 32 of the holder 30. At that time, if differences among protruding amounts of the rear protrusions 56 are within a permissible range, at least three of the rear protrusions 56 are brought into abutment with the end face portion 32. Similarly to the case of the front protrusions 54, in the case where the differences among the protruding dimensions of the rear protrusions 56 are out of the permissible range, the protruding amounts of the rear protrusions 56 must be adjusted. Also in this case, the adjustment of the protruding amounts of the rear protrusions 56 is remarkably easier than adjusting a tilt of the whole of the rear-end surface of the sleeve member 940 of Patent Document 1.

As understood from FIG. 5, the sleeve member 50 is sandwiched between the contact 40 and the holder 30. And, the front protrusions 54 are brought into abutment with the rear-end face 445 of the flange portion 441, and the rear protrusions 56 are brought into abutment with the end face portion 32 of the holder 30. Thus, the sleeve member 50 regulates rearward movement of the contact 40 with respect to the housing 20. However, the present invention is not limited thereto. In a case where the sleeve member 50 does not have the rear protrusions 56, the main portion 52 of the sleeve member 50 may be brought into abutment with the holder 30 directly or via the annular member 60. In a case where the annular member 60 is used, it is necessary that the annular member 60 has a predetermined strength in the front-rear direction.

As shown in FIG. 4, the annular member 60 is located between the main portion 52 of the sleeve member 50 and the holder 30 in the front-rear direction when it is accommodated in the contact accommodation portion 22 of the housing 20. In detail, the sleeve member 50 is sandwiched between the rear-end face 525 of the main portion 52 of the sleeve member 50 and the end face portion 32 of the holder 30. In the present embodiment, the annular member 60 is sandwiched between the electrical wire 82 and the housing 20 and prevents water from entering the contact accommodation portion 22 from behind the contact accommodation portion 22. However, the present invention is not limited thereto. The annular member 60 may not have a waterproof purpose but be a thing having a purpose for preventing the rearward movement of the main portion 52 of the sleeve member 50 with respect to the holder 30 in place of the rear protrusions 56 of the sleeve member 50.

Although the specific explanation about the present invention is made above referring to the embodiments, the present invention is not limited thereto but susceptible of various modifications.

For example, although the number of the electrical wire 82 connected to the wire connection portion 46 of the contact 40 is one in the aforementioned embodiment, the number of electrical wires 82 connected to the wire connection portion 46 may be two or more. In that case, a member which has a plurality of through holes corresponding to the plurality of the electrical wires 82 instead of the central hole 62 may be used in place of the annular member 60.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector comprising a housing, a holder, a contact, an electrical wire and a sleeve member, wherein:
   the housing is formed with a contact accommodation portion;
   the contact is accommodated in the contact accommodation portion at least in part;
   the holder is attached to the housing and defines a rear end of the contact accommodation portion in a front-rear direction;
   the holder is formed with a through hole piercing thereof in the front-rear direction;
   the electrical wire is connected to the contact and extends from the contact accommodation portion to an outside of the contact accommodation portion through the through hole of the holder;
   the contact is provided with an abutment portion;
   the sleeve member has a main portion and three or more front protrusions;
   the main portion extends in the front-rear direction and has a C-shape section on a plane perpendicular to the front-rear direction;
   each of the front protrusions protrudes forward from a front end of the main portion in the front-rear direction;
   the sleeve member is attached to the contact so as to accommodate a part of the contact and a part of the electrical wire in the main portion and located between the abutment portion and the holder in the front-rear direction; and
   at least three of the front protrusions are brought into abutment with the abutment portion.

2. The connector as recited in claim 1, wherein in a direction perpendicular to the front-rear direction and to a surface of the main portion of the sleeve member, a maximum size of each of the front protrusions is larger than a size of the main portion in a vicinity of the front protrusion.

3. The connector as recited in claim 1, wherein:
   the sleeve member has three or more rear protrusions protruding rearward from the main portion in the front-rear direction; and
   at least three of the rear protrusions are brought into abutment with the holder.

4. The connector as recited in claim 3, wherein:
   the connector further comprises an annular member;
   the annular member is located between the rear end of the main portion of the sleeve member and the holder in the contact accommodation portion;
   the annular member is formed with three or more through holes piercing thereof in the front-rear direction;
   the through holes of the annular member correspond to the rear protrusions, respectively; and
   each of the rear protrusions is inserted in the through hole corresponding thereto.

5. The connector as recited in claim 3, wherein:
   the front protrusions correspond to the rear protrusions, respectively;
   the main portion of the sleeve member is formed with an elongated ridge which couples each of the front protrusions with the rear protrusion corresponding the front protrusion in the front-rear direction; and
   the elongated ridge protrudes from a surface of the main portion of the sleeve member.

6. The connector as recited in claim 3, wherein an arrangement of the rear protrusions has rotation symmetry about a symmetry axis extending in the front-rear direction.

7. The connector as recited in claim 1, wherein an arrangement of the front protrusions has rotation symmetry about a symmetry axis extending in the front-rear direction.

8. The connector as recited in claim 1, wherein:
   the connector comprises a first waterproof member and a second waterproof member;
   the first waterproof member and the second waterproof member are located in the contact accommodation portion;
   the contact has a flange;
   the flange is formed with a groove recessed inward in a circumference surface thereof;
   the first waterproof member is attached in the groove; and
   the second waterproof member is sandwiched between a rear end of the main portion of the sleeve member and the holder.

9. The connector as recited in claim 8, wherein:
   the second waterproof member has an annular shape;
   the second waterproof member is formed with three or more through holes piercing thereof in the front-rear direction;
   the sleeve member has three or more rear protrusions protruding rearward from the rear end of the main portion in the front-rear direction;
   the through holes of the second waterproof member correspond to the rear protrusions, respectively; and
   each of the rear protrusions is inserted in the through hole corresponding thereto.

10. The connector as recited in claim 8, wherein:
the connector further comprises a sensor;
a wiring of the sensor is arranged in a slit portion of the sleeve member; and
the wiring of the sensor extends rearward though an additional through hole formed in the second waterproof member and the through hole of the holder.

11. The connector as recited in claim 10, wherein:
the contact is formed with a hole bored in a direction perpendicular to the front-rear direction;
the sensor is longitudinally inserted and arranged in the hole; and
the wiring of the sensor is curved toward in the front-rear direction at an edge of the hole.

12. The connector as recited in claim 8, wherein:
the electrical wire connected to the contact is one in number; and
each of the first waterproof member and the second waterproof member has an annular shape.

* * * * *